(12) United States Patent
Huynen et al.

(10) Patent No.: US 6,279,745 B1
(45) Date of Patent: Aug. 28, 2001

(54) SEAL FOR A STERILIZABLE BAG AND METHOD OF MAKING THE SAME

(75) Inventors: Marc Huynen, Jodoigne; Stéphane Huynen, Bierbeek; Steven Vanhamel, Herk-de-Stad, all of (BE)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

(21) Appl. No.: 09/519,057

(22) Filed: Mar. 3, 2000

(30) Foreign Application Priority Data

Mar. 4, 1999 (EP) .................................................. 99200612

(51) Int. Cl.[7] .......................... A61B 19/02; B65D 30/00; B31B 1/64
(52) U.S. Cl. .......................... 206/439; 383/107; 493/189
(58) Field of Search .................................... 206/438, 439, 206/484.1, 484; 493/189; 383/107, 113, 200; 53/425; 428/35.2

(56) References Cited

U.S. PATENT DOCUMENTS

| | | | |
|---|---|---|---|
| 4,176,746 | * 12/1979 | Kooi | 206/438 |
| 4,576,844 | 3/1986 | Murray et al. | |
| 4,630,729 | * 12/1986 | Hirt et al. | 206/438 X |
| 5,308,691 | 5/1994 | Lim et al. | |
| 5,459,978 | * 10/1995 | Weiss et al. | 53/425 |
| 5,551,781 | * 9/1996 | Wilkes et al. | 206/439 X |
| 5,590,777 | * 1/1997 | Weiss et al. | 206/439 |
| 5,653,090 | * 8/1997 | Weiss et al. | 53/425 |
| 5,682,618 | 11/1997 | Megchelsen et al. | |
| 5,947,287 | * 9/1999 | Weiss et al. | 206/439 |
| 6,117,505 | * 9/2000 | Weiss et al. | 428/35.2 |

FOREIGN PATENT DOCUMENTS 796802   9/1997   (EP) .

* cited by examiner

*Primary Examiner*—Bryon P. Gehman
(74) *Attorney, Agent, or Firm*—Oliver A. Zitzmann; Steven J. Hultquist; Robert A. McLauchlan

(57) ABSTRACT

The present invention provides a system and method for a seal for a sterilizable bag. This seal is made between a first polymeric sheet material (5) and a second polymeric sheet material (3). The first sheet material (5) should be sufficiently porous so as to allow or permit gas or steam sterilization but substantially impervious to bacteria. The second sheet material (3) includes an outer heat sealable layer. The seal (4) is fabricated from a first thermal surface weld (15) between the heat sealable layer of the second sheet material (3) and the first sheet material (5), and a second thermal melt weld (12) between at least the heat sealable layer of the second sheet material (3) and the first sheet material (5). The thermal melt weld (12) may be narrower than the first weld (11) and lying within the boundaries of the first weld (11). Furthermore, seal (4) may be sufficiently flat in order to allow a cross-heat seal using conventional equipment.

24 Claims, 3 Drawing Sheets

SEAL FOR A STERILIZABLE BAG AND METHOD OF MAKING THE SAME

BACKGROUND OF THE INVENTION

The present invention relates to a seal for a sterilizable, tube, bag or pouch which is suitable for the construction of a bag or pouch into which an object may be introduced followed by the bag being sealed and sterilised using gamma radiation, ethylene oxide or steam at at least 125° C. as well as being suitable for other sterilisation methods.

Several ways have been attempted for sealing bags so that they remain intact during sterilisation in which vacuum may be applied. Under vacuum and temperature the bag or pouch tends to inflate placing high stresses on any seals which are mechanically weakened by the high temperature. In accordance with one method a bag is formed from a first surgical grade sheet which impervious or substantially impervious to bacteria and similar infectious bodies but being pervious to sterilising gases such as ethylene oxide and including steam and a second impervious sheet made for instance from high density polythene. The two sheets can be joined together by a surface welding technique, that is in effect the two materials are locally callendered together under temperature and pressure so as to form a surface weld between the two dissimilar materials. The temperatures and pressures used are usually not sufficient to produce bulk melting of the sheet materials but sufficient surface welding an compaction of the materials occurs so that the seal produced is impermeable or at least no more permeable than the gas pervious layer. This type of weld preserves the basic structure of both materials even in the weld but suffers from low and variable tear strengths. The tear strength of such a surface weld may be under 1 N/mm and usually it is not possible to guarantee a tear strength of 0.6 N/mm at all places along the seal. One possible reason for this is that the gas pervious material is not as uniform as a solid gas impervious sheet and the seal strength variations are caused by this variability.

Another sealing method may be described as melt welding. In this procedure a weld is produced at a temperature such the two materials melt into each other, whereby the gas pervious material may absorb the molten mass of the impervious material or both materials may melt together. The temperatures and pressures may be such as to coalesce the two materials. This procedure creates a strong bond but has certain disadvantages. Often the impervious sheet material is highly oriented. This frozen-in strain may be released by melt welding such that the impervious material contracts. Due to the difference in the materials used for the impervious and pervious layers, the degree of contraction is different resulting in the seal buckling on one side. This buckling can be so severe that the seal folds over to form a total of four thickness of material adjacent the seal position. Because the internal strains are released by the welding process, such a seal may be described as a thermally relaxed melt welded seal. When a pouch made with such seals is finally sealed by a cross seal to form a closed bag, this double layer at the existing seals can cause difficulties in particular it can promote the formation of very small diameter pores or openings close to the folded over seal. This problem can be avoided by the use of specialised welding techniques and apparatus but this is perceived as a disadvantage by some.

It is an object of the present invention to provide a seal for a sterilizable pouch or bag which can withstand the pressures generated by steam sterilisation at 125° C. and above.

It is a further object of the invention to provide seal for a sterilizable pouch which can be securely manufactured relatively easily.

SUMMARY OF THE INVENTION

A seal between a first and second polymeric sheet material, the first sheet material being sufficiently porous to permit gas or steam sterilisation but substantially impervious to bacteria, and the second sheet material being substantially gas impervious, and the second sheet material comprising at least an outer heat sealable layer, the seal comprising:

a first thermal surface weld between the heat sealable layer of the second sheet material and the first sheet material; and a second thermal melt weld between at least the heat sealable layer of the second sheet material and the first sheet material, the thermal melt weld being narrower than the first weld and lying within the boundaries of the first weld.

The present invention also provides a method of making a seal between a first and second polymeric sheet material, the first sheet material being sufficiently porous to permit gas or steam sterilisation but substantially impervious to bacteria, and the second sheet material being substantially gas impervious, and the second sheet material comprising at least an outer heat sealable layer, the method comprising the steps of:

forming a surface thermal weld between the first and second sheet materials; and forming a melt weld between the first and second sheet materials which is narrower than the first weld and which lies within the area of the first weld.

The invention may provide a sealable sterilizable bag or pouch which can withstand steam sterilisation at in excess of 125° C. without bursting.

The invention may also provide a bag or pouch which is securely sealed.

The invention may also provide a sterilizable bag with very high cleanliness.

The dependent claims define further embodiments of the present invention. The invention, its embodiments and advantages will now be described with reference to the following drawings.

DESCRIPTION OF THE ILLUSTRATIVE EMBODIMENTS

Figure 1A:
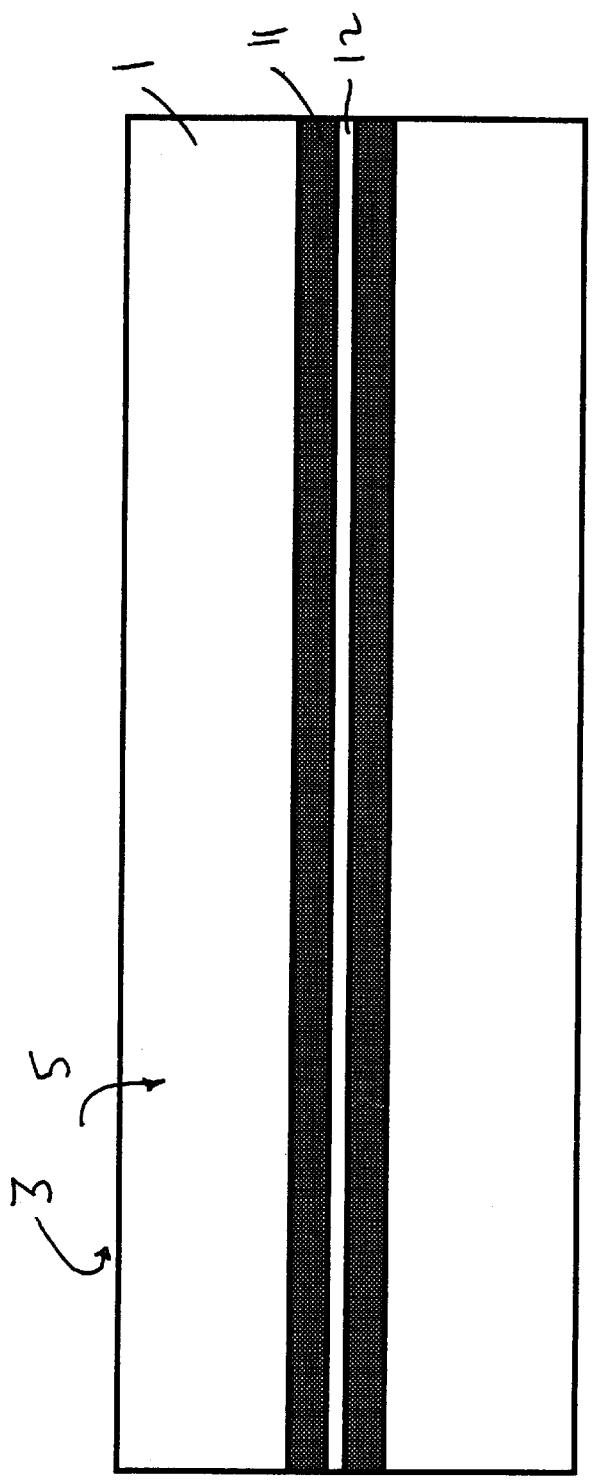
FIG. 1A shows a schematic top view of seal in accordance with a first embodiment of the present invention.

The present invention will be described with reference to certain specific embodiments and to the drawings but the invention is not limited thereby but only by the claims. Further, in the drawings some of the dimensions, especially thicknesses of sheet materials may be exaggerated for clarity purposes.

Figure 1B:
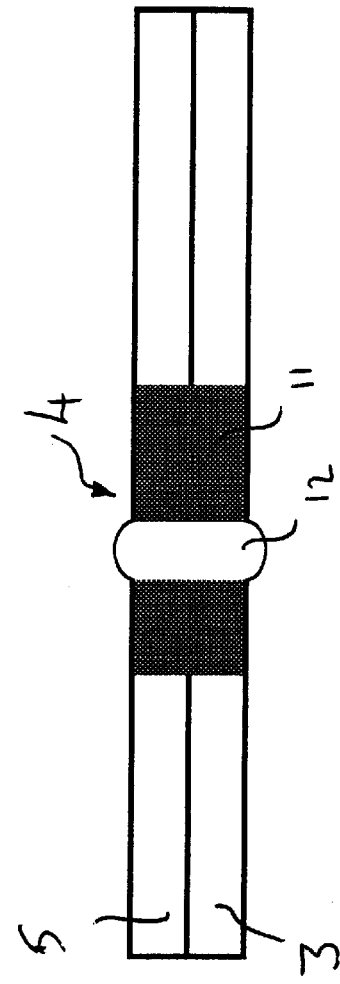
FIG. 1B shows a schematic cross-section of the seal shown in FIG. 1A.

FIG. 1A shows schematically a top view of a seal 4 for a sterilizable tube, package, pouch or bag 1 in accordance with a first embodiment of the present invention. FIG. 1B shows a cross section through seal 4. A substantially gas impervious plain plastic sheet material 3 is sealed to a membrane sheet 5 by means of a seal 4. Plain plastic sheet material 3 may be any suitable plastic material, preferably flexible, which can preferably withstand steam sterilisation of the closed and completely sealed bag 1 at at least 125° C. It is particularly preferred if all the sheet materials used in the bags or pouches in accordance with the present invention are clean to at least class 200 and more preferably to class 100 or better in accordance with MIL-STD 1246C. It is also preferred in some applications if the plain sheet material 3 comprises at least two, preferably three or more discretely and separately formed layers which are intimately and permanently. bonded together in order to reduce the risk of pin-holes. At least an outer layer of plastic sheet material 3, which has to form a heat seal, may typically be a thermoplastic polyolefine which can withstand steam sterilisation at at least 125° C., more preferably at at least 131° C. Non-limiting examples of suitable polyolefines are High Density Polyethylene (HDPE) or Polypropylene. High density polyethylene is a type of polyethylene made at low pressure by polymerising ethylene using catalysts. A suitable density range is 0.94 to 0.96 g/cm$^3$, preferably 0.955 g/cm$^3$. In particular, the sheet material 3 may be made from HDPE grade GM 9255F supplied by Hoechst AG, Germany, for example by sheet extrusion or casting or by lay flat tubing extrusion methods. Low density polyethylene, or ultra low density polythene sheet materials have a generally too low softening temperature to withstand steam sterilising at 125° C or more, but such materials are not excluded from the invention.

The various layers of sheet material 3 may differ from the heat-sealable outer layer and may include other high temperature polymeric materials such as polyester (e.g. polyethylene teraphthalate), or a layer of paper on which information may be easily printed. Further, it is preferred in some applications if sheet material 3 is highly oriented and has the same direction of orientation in each layer. Sheet material 3 may be 30 to 150 micron in thickness, preferably 70 to 90 micron.

Membrane sheet material 5 is a surgical grade membrane being impervious or substantially impervious to bacteria and similar infectious bodies but being pervious to sterilising gases such as ethylene oxide and including steam. Preferably, membrane sheet 5 is a high-strength, tear-resistant material having a Gurley Hill air permeability between 5 and 75 seconds in accordance with ASTM D726 and a low liquid permeability of at least 100 mm water head, preferably more than 170 mm in accordance with ISO 811. Membrane sheet material 5 is sealed to sheet material 3 by means of a seal 4. Preferably, membrane sheet material 5 should be sealable to sheet material 3 by heat sealing to form a secure seal without the general destruction of the specific properties of each material. In accordance with the present invention a secure seal has a seal strength of at least 1,5 N/mm, preferably greater than 2 N/mm in accordance with specification NFT 54–122. Typically, membrane sheet material 5 may include a spunbonded or melt-bonded polyolefine fibre web, for example a melt-blown polypropylene fibre web and spunbonded fibre sheet laminated thereto as described in U.S. Pat. No. 5,308,691 which is incorporated herein by reference. Membrane sheet material 5 may be spunbonded polyethylene under the trade name Tyvek™, grade L1073B from E. I. DuPont de Nemours, France. Membrane sheet material 5 may be 75 to 300 micron, preferably 110 to 260 micron in thickness. Spunbonded or melt bonded materials are usually opaque, e.g. white opaque.

Seal 4 is preferably made with a heat sealing machine such as an Automatic Pouch Machine made by GN Packaging Equipment of Canada. Seal 4 may be made by a combination of current impulse heat sealing with a typical on/off time of 0.25/0.5 sec. and a typical pressure of 3 to 4 bar and melt heat sealing at a temperature in the range 150 to 240° C. and typical pressure of 30 kPa.

Seal 4 includes two parts, firstly an elongate wider surface welded portion 11 and a narrow elongate melt welded portion 12 which lies within the margins of the surface welded portion 11. The surface welded portion 11 may be typically 10 to 20 mm wide whereas the smaller melt welded seal 12 my be typically 2 to 5 mm wide. The melt welded portion 12 may be a thermally relaxed melt welded seal. Surprisingly, it is has been found that a combination of a surface weld 11 with a melt weld 12 whereby the melt weld 12 is narrower than the surface weld 11 and lies within the margins of the surface welded seal 12 provides a seal 4 with high tear strength, e.g. at least 1.5 N/mm tear strength and preferably, 2 N/mm or greater tear strength, and which is relatively flat. The final seal 4 is flat enough that an additional thermal cross-seal to seal the bag can be performed without a problem using conventional heat sealing equipment. Seals 4 produced in accordance with the present invention are no less impervious than the pervious sheet 5 used to make them.

Figures 2A, 2B:
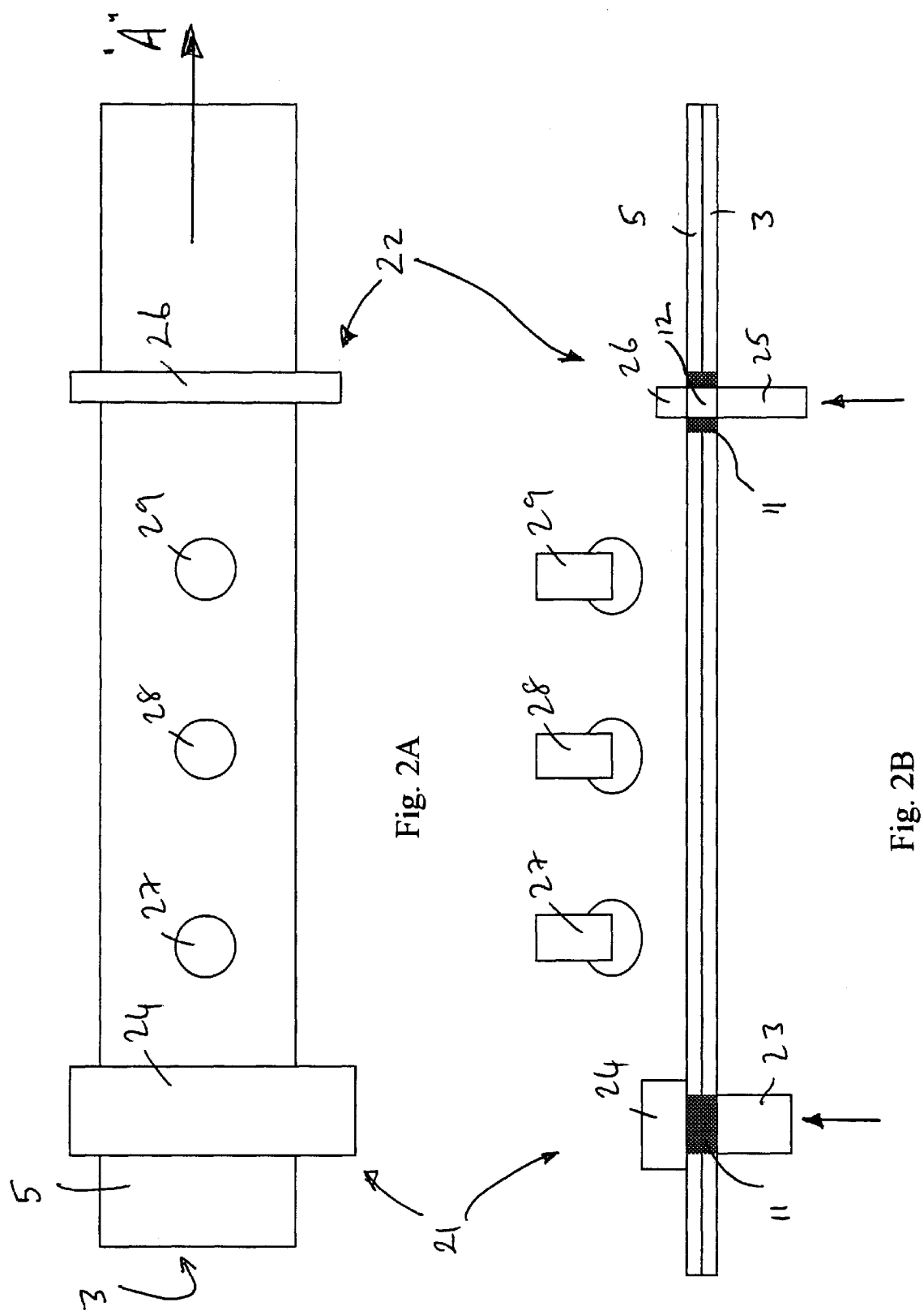
FIG. 2A shows a schematic top view of a manufacturing line in accordance with a second embodiment of the present invention.
FIG. 2B shows a schematic cross-section of the line shown in FIG. 2A.

The manufacture of seal 4 will now be described with reference to FIGS. 2A and B. FIG. 2A is a schematic top view of a production line for producing seals 4. FIG. 2B is a schematic side view of the equipment shown in FIG. 2A. Two sealing stations 21, 22 are provided which can be included in a single unit if desired. Sheets 3 and 5 are placed one above the other. In the drawings the gas pervious sheet 5 is placed above the impervious sheet 3 but the present invention is not limited thereto. The general direction of movement of sheets 3, 5 is shown by the arrow "A".

At station 21 the wider surface weld 11 is produced by pressing a heated strip or blade against the impervious sheet 3 while the gas pervious sheet 5 is supported by a support 24. Heat is preferably applied with the blade on the side of the impervious sheet 3. The heated strip 23 is preferably made from a material with a high thermal conductivity, e.g. a metal. The support 24 may be made of metal, or may be made of, or surfaced with a thermally insulting material, e.g. hard rubber. The strip 23 may be operated at a temperature so as to produce a thermal surface weld 11 between the gas pervious sheet 5 and the impervious sheet 3. For instance, the strip 23 may be maintained at a temperature of about 170° C. when the impervious sheet is made of HDPE and the gas pervious sheet is Tyvek™. The support 24 may be maintained at room temperature. Strip 23 and support 24 may include suitable heating or cooling circuits to maintain them at the appropriate temperatures. A good surface seal is normally opaque indicating that the gas pervious material has not be heated excessively. Preferably, the surface weld 11 is made using impulses, the impulse time may be of the order of 0.5 sec.

The sheets 3, 5 are indexed forward to the second station 22 where the narrower melt weld 12 is located into the surface weld already created. To do this a second narrower heated strip or blade 25 is provided for pressing against the impervious sheet 3 and a second support 26 is provided for supporting the sheet 5 against the pressure of the heated strip 25 on the impervious sheet 3. To melt the materials of sheets 3 and 5 together higher temperatures are generally required than for the surface welding performed in station 21. For instance, when the impervious sheet 3 is HDPE and the gas pervious sheet 5 is Tyvek™, the heated strip 25 may be maintained at a temperature of 250–270° C. and the support 26 may be maintained at a temperature of 160° C. Impulse welding is not required in this process. The welding time may be of the order of 1 sec. Use may be made of the heat introduced into the sheet at station 21 to pre-heat sheets 3 and 5 before they reach the melt welding station 22. Additionally, infra-red heating lamps 27 to 29 may provide further pre-heating of the sheet 5 and/or sheet 3. The pressure and temperature applied between the support 26 and the strip 25 and the pre-heating provided by station 21 and the optional heating devices 27–29 is preferably controlled so that an elongate melt weld is set into the surface weld already formed at station 21. Preferably, the weld is a thermally relaxed melt weld 12. As the materials are molten and coalesced in the melt weld procedure, the final seal is usually translucent or transparent and the internal stresses are usually relaxed.

Figure 3:
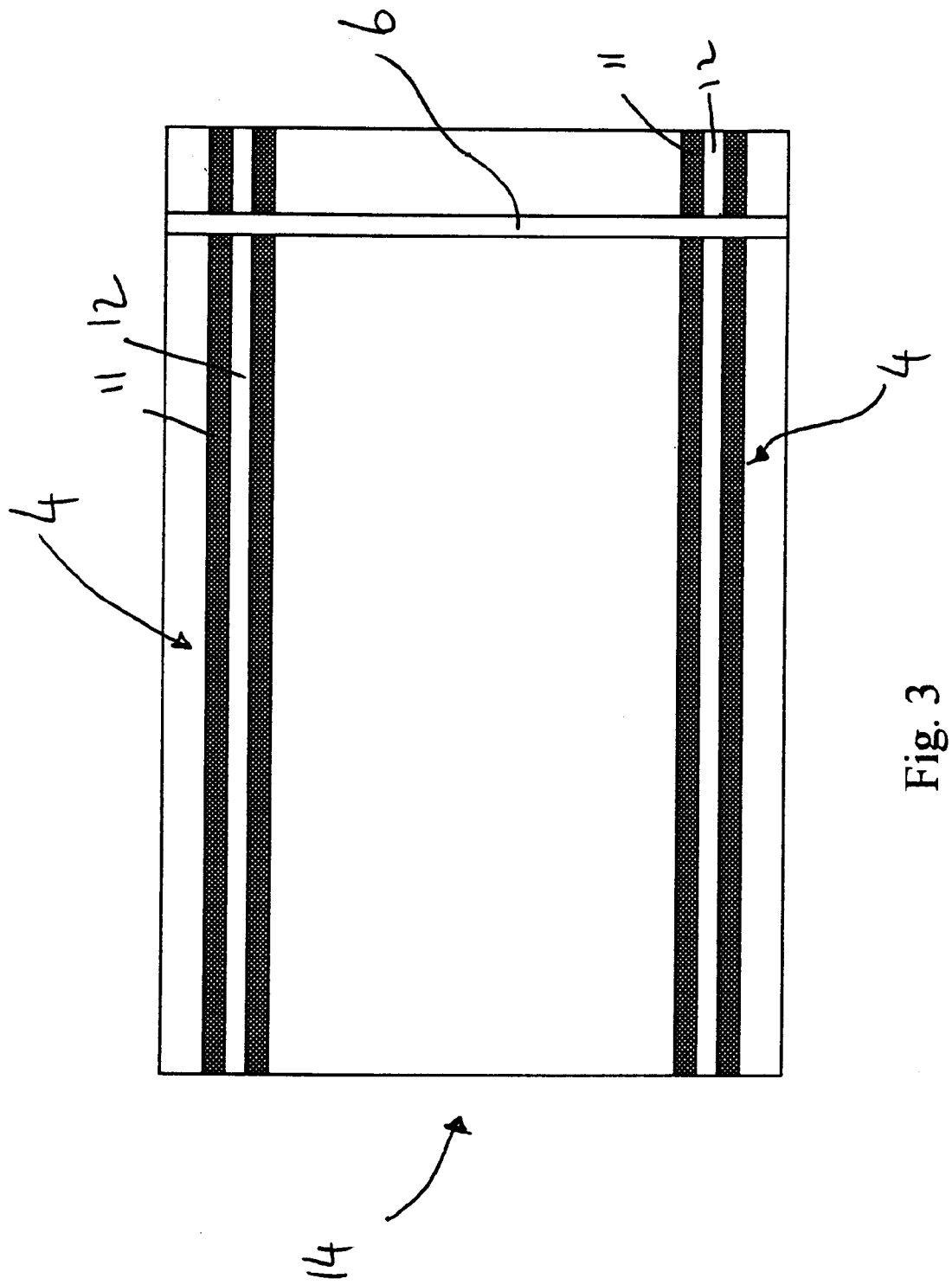
FIG. 3 shows a schematic front view of a pouch in accordance with a third embodiment of the present invention.

The relative flatness of the final seal 4 is surprising. It is assumed without being limited by theroy that the pre-formation of the surface weld 11 and/or the pre-heating of sheets 3, 5 assists in the formation of a non-buckeld seal 4 in accordance with the present invention. Preferably, the melt weld 12 is placed within the surface weld 11 so that it is flanked on both sides by portions of the surface weld 11 although perfect symmetry is not necessary. As shown in FIG. 3 two secure seals 4 in accordance with the present invention and a cross-heat seal 6 (which may also be in accordance with the present invention) are preferably arranged to form a pocket or pouch having three sealed sides and an opening 14 in the fourth side. An object may be introduced into the opening 14 and stored in the pouch 1. The pouch 1 may be sealed and then sterilised. Objects may be medical instruments, medicines, surgical components as well as semiconductor or microelectronic devices. For instance, after sealing, the bag may be placed in an autoclave and vacuum applied to evacuate the bag. Then steam is introduced at a temperature of 125° C. or above. During steam sterilisation, the steam may enter and leave the pouch 1 via the membrane sheet 5, thus sterilising the object in the bag and the inside of the bag. After sterilisation, the bag is again evacuated. Due to the security of the seals 4 as well as their flatness which allows the production of a secure cross-seal 6, the bag 1 remains intact during the autoclaving and the sterilising process time can be shortened by the use of higher vacuum levels and temperatures. The bag 1 may also be sterilised with other sterilising gases such as ethylene oxide and/or with gamma radiation.

While the invention has been shown and described with reference to preferred embodiments, it will be understood by those skilled in the art that various changes or modifications in form and detail may be made without departing from the scope and spirit of this invention as defined in the attached claims.

What is claimed is:

1. A seal between a first and a second polymeric sheet material, the first sheet material being sufficiently porous to permit gas or steam sterilisation but substantially impervious to bacteria, and the second sheet material being substantially gas impervious, and the second sheet material comprising at least an outer heat sealable layer, the seal comprising:
    a first thermal surface weld between the heat sealable layer of the second sheet material and the first sheet material; and
    a second thermal melt weld between at least the heat sealable layer of the second sheet material and the first sheet material, the thermal melt weld being narrower than the first weld and lying within the boundaries of the first weld.

2. The seal according to claim 1 wherein the second sheet material comprises a thermoplastic polyolefin.

3. The seal according to claim 2 wherein said second sheet material comprises one of polypropylene and high density polyethylene.

4. The seal according to claim 2, wherein the seal has a tear strength of at least 1.5 N/mm.

5. The seal according to claim 1, wherein the first sheet material includes a fibre web selected from the group consisting of spun-bonded fibre web and melt bonded fibre web.

6. The seal according to claim 2, wherein the first sheet material includes a fibre web selected from the group consisting of spun-bonded fibre web and melt bonded fibre web.

7. The seal according to claim 2, wherein the seal has a tear strength of at least 2 N/mm.

8. The seal according to claim 1, wherein the seal has a tear strength of at least 1.5 N/mm.

9. The seal according to claim 8, wherein the first sheet material includes a fibre web selected from the group consisting of spun-bonded fibre web and melt bonded fibre web.

10. The seal according to claim 1, wherein the seal has a tear strength of at least 2 N/mm.

11. A sterilisable pouch comprising a seal between a first and a second polymeric sheet material, the first sheet material being sufficiently porous to permit gas or steam sterilisation but substantially impervious to bacteria, and the second sheet material being substantially gas impervious, and the second sheet material comprising at least an outer heat sealable layer, the seal comprising:
    a first thermal surface weld between the heat sealable layer of the second sheet material and the first sheet material; and
    a second thermal melt weld between at least the heat sealable layer of the second sheet material and the first sheet material, the thermal melt weld being narrower than the first weld and lying within the boundaries of the first weld.

12. The sterilisable pouch according to claim 11, wherein the second sheet material comprises a thermoplastic polyolefin.

13. The sterilisable pouch according to claim 12, wherein said second sheet material comprises one of polypropylene and high density polyethylene.

14. The sterilisable pouch according to claim 12, wherein the seal has a tear strength of at least 1.5 N/mm.

15. The sterilisable pouch according to claim 12, wherein the first sheet material includes a fibre web selected from the group consisting of spun-bonded fibre web and melt bonded fibre web.

16. The sterilisable pouch or bag according to claim 12, wherein the seal has a tear strength of at least 2 N/mm.

17. The sterilisable pouch according to claim 11, wherein the seal has a tear strength of at least 1.5 N/mm.

18. The sterilisable pouch according to claim 17, wherein the first sheet material includes a fibre web selected from the group consisting of spun-bonded fibre web and melt bonded fibre web.

19. The sterilisable pouch according to claim 11, wherein the first sheet material includes a fibre web selected from the group consisting of spun-bonded fibre web and melt bonded fibre web.

20. The sterilisable pouch or bag according to claim 11, wherein the seal has a tear strength of at least 2 N/mm.

21. A method of making a seal between a first and a second polymeric sheet material, the first sheet material being sufficiently porous to permit gas or steam sterilisation but substantially impervious to bacteria, and the second sheet material being substantially gas impervious, and the second sheet material comprising at least an outer heat sealable layer, the method comprising the steps of forming a surface thermal weld between the first and second sheet material; and forming a melt weld between the first and second sheet materials which is narrower than the first weld and which lies within the area of the first weld.

22. The method according to claim 21 wherein the second sheet material comprises a thermoplastic polyolefin.

23. The method according to claim 22, wherein said second sheet material comprises one of polypropylene and high density polyethylene.

24. The method according to claim 21 wherein said second sheet material comprises one of polypropylene and high density polyethylene.

* * * * *